United States Patent [19]

Sanders et al.

[11] Patent Number: 5,735,667
[45] Date of Patent: Apr. 7, 1998

[54] METHOD AND APPARATUS FOR MINIMIZING LEAKAGE IN TURBINE SEALS

[75] Inventors: William P. Sanders, Aurora, Canada; Anthony F. Mitola, Clifton Park, N.Y.

[73] Assignee: Innovative Technology, L.L.C.

[21] Appl. No.: 643,192

[22] Filed: May 6, 1996

[51] Int. Cl.[6] .................................................. F04D 29/08
[52] U.S. Cl. ........................... 415/170.1; 277/53; 277/215
[58] Field of Search ........................... 415/170.1, 173.5; 277/53, 215

[56] References Cited

U.S. PATENT DOCUMENTS

| | | | |
|---|---|---|---|
| 3,897,169 | 7/1975 | Fowler | 415/172 A |
| 4,046,388 | 9/1977 | Meyer | 277/53 |
| 4,351,532 | 9/1982 | Laverty | 277/53 |
| 4,420,161 | 12/1983 | Miller | 277/56 |
| 5,026,075 | 6/1991 | Massarani | 415/56 |
| 5,271,712 | 12/1993 | Brandon | 277/53 |
| 5,344,162 | 9/1994 | Kernon et al. | 277/27 |
| 5,362,072 | 11/1994 | Balton | 415/174.5 |

OTHER PUBLICATIONS

William P. Sanders, "Turbine Steam Path Engineering for Operations and Maintenance Staff," Chapter 11, pp. 11.1–11.35, Course Notes (Dec. 1988).

Primary Examiner—John T. Kwon
Attorney, Agent, or Firm—Heslin & Rothenberg, P.C.

[57] ABSTRACT

The invention pertains to a method and apparatus for minimizing the leakage of working fluid through the fluid leakage path of a turbine seal. The invention may be described in general terms as producing from rotary motion of the working fluid a region of lowered pressure in the working fluid in a portion of the leakage path adjacent a high pressure side of a sealing ring of the seal. This function may be performed by producing and shedding vortices in the working fluid at one or more points about the circumference of the sealing ring. This function may be accomplished by providing a sealing ring having a tooth portion provided in one or more tooth segments, portions of one or more trailing edges of the tooth segments extending outward in a common direction.

19 Claims, 6 Drawing Sheets

METHOD AND APPARATUS FOR MINIMIZING LEAKAGE IN TURBINE SEALS

FIELD OF THE INVENTION

The field of the present invention is turbine seals. The invention was developed to address the problem of minimizing the leakage of working fluid through the fluid leakage path of a turbine seal.

BACKGROUND OF THE INVENTION

The turbine is a well known energy conversion apparatus which is characterized by a rotating member which turns in response to an applied force. Typically this force is generated by directing a high pressure working fluid such as superheated steam at a series of blade rows which extend radially from a rotor. The efficiency of the turbine depends upon its ability to maximize the conversion of working fluid energy into rotation of the rotating member. Sealing devices are therefore employed about the rotating member to contain the working fluid to working spaces within the turbine.

The sealing devices used in turbines are known variously as steam seals, gland seals, labyrinth seals, steam packings, diaphragm packings, and pressure packings. The fundamental component of these seals is the sealing ring. The sealing ring is a ring shaped structure which is typically provided as several arcuate sealing ring segments. The sealing ring encircles the rotating member and occupies space between the rotating member and the turbine casing or other surrounding structure.

Figure 1A:
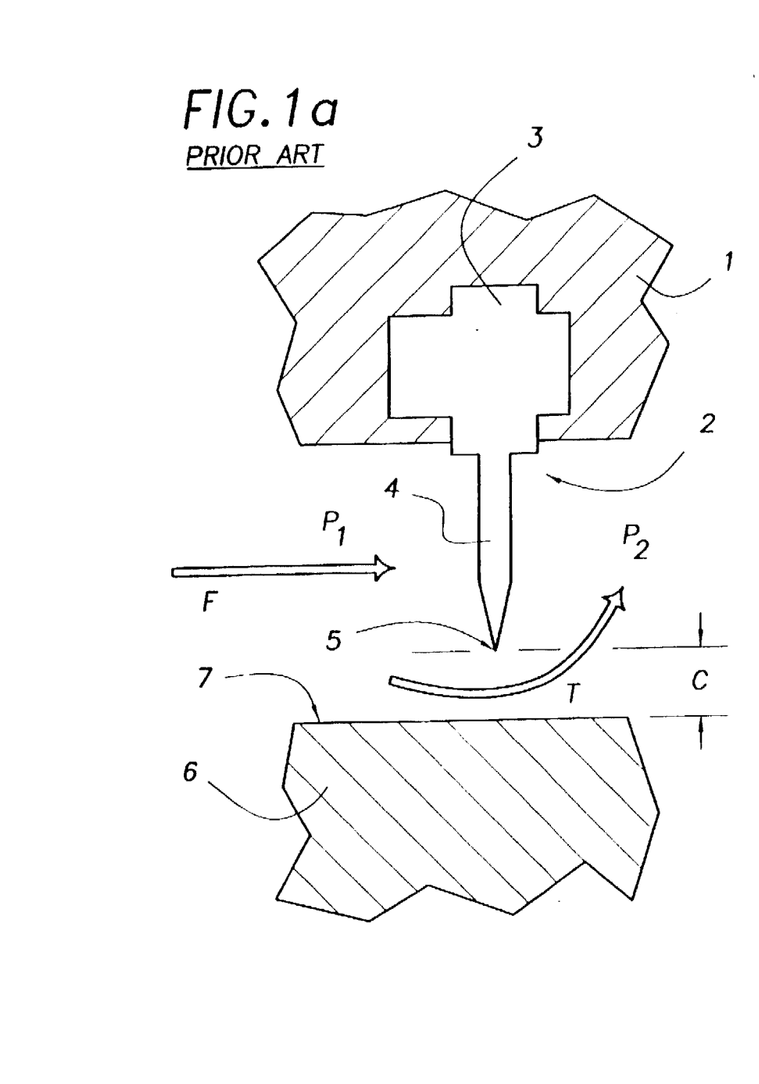
FIG. 1a illustrates a turbine seal including a sealing ring having a structure commonly known in the art.

A typical sealing ring segment providing a seal in a turbine is shown in cross-section in FIG. 1a. The sealing ring segment 2 comprises a base portion 3 which is received by a complimentary slot in a supporting structure 1. The supporting structure may be the turbine casing or another structure surrounding a rotating member of the turbine, or it may be a portion of the rotating member of the turbine. In the case of a sealing ring supported by the turbine casing or other surrounding structure, a tooth portion 4 extends radially inward from the base portion 3 toward the radially outward surface 7 of the rotating member 6 of the turbine. The rotating member may be the rotor of the turbine, or a band encircling a row of blades extending radially outward from the rotor, or some other rotating portion. A radial gap having a clearance C separates the surface 7 of the rotating member 6 from the edge 5 of the tooth portion 4 to prevent contact therebetween.

The path through which fluid may flow through the seal is known as the leakage path. In the structure illustrated in FIG. 1, working fluid in the leakage path will tend to escape through the space between the edge 5 of the tooth portion 4 and the surface 7 of the rotating member 6. Working fluid flowing toward the seal will have a motion component generally in the direction indicated by line F and will further have a rotary motion component relative to the sealing ring. Fluid passing the sealing tooth portion will undergo a throttling effect which induces motion generally along the path indicated by flow line T. Given a working pressure $P_1$ in the portion of the turbine upstream of the seal, the pressure $P_2$ of fluid which has passed through the seal will be less than $P_1$.

Figure 1B:
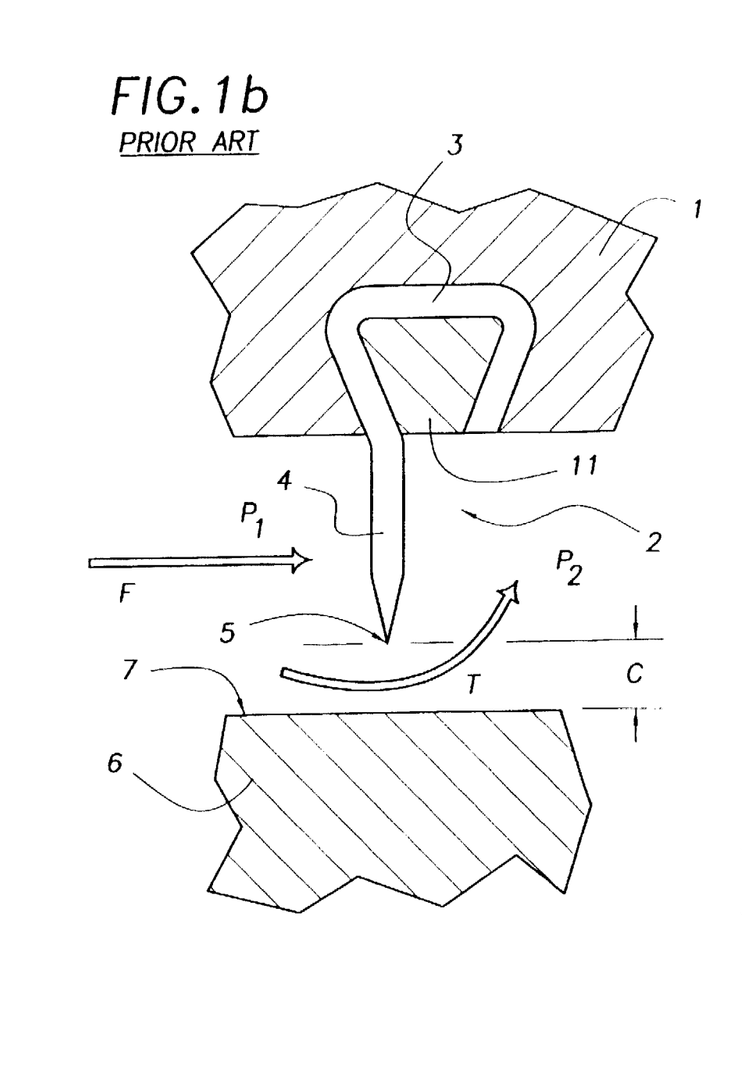
FIG. 1b illustrates a turbine seal including a sealing ring having an alternative structure commonly known in the art.

Alternate forms of the sealing ring are also commonly known. FIG. 1b illustrates an alternative sealing ring 2 in which a hook shaped base 3 is received by a complimentary slot within a supporting structure 1. A caulking strip 11 inserted within the base portion 3 retains the sealing ring 2 within the slot.

There are four conventional manners known to those of ordinary skill in the turbine seal art for addressing the problem of minimizing fluid leakage through the leakage path of a turbine seal. The first convention is minimizing the clearance of the radial gap between the edge of the tooth portion and the rotating member. The effectiveness of this strategy is limited in that the rotating member will undergo thermal expansion and transient radial deflections during operation. Depending upon the selected clearance, contact may occur between the rotating member and the edge of the tooth portion, causing wear to the tooth portion and increasing the clearance of the radial gap.

Figure 1C:
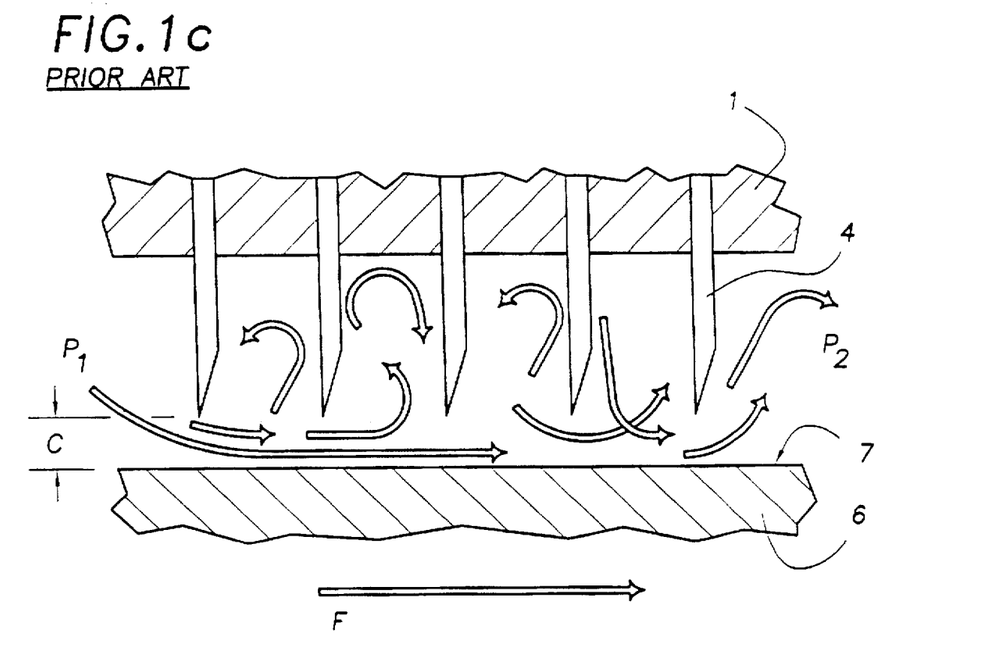
FIG. 1c illustrates a multi-toothed turbine seal commonly known in the art.

The second conventional manner for minimizing fluid leakage is providing multiple teeth in series along a section of the rotating member. A seal employing multiple teeth is sometimes referred to as a gland seal. FIG. 1c shows in cross-section a typical multi-tooth seal in which a plurality of teeth 4 extend toward the surface 7 of a rotating member 6. Working fluid flows through the fluid leakage path generally in the direction indicated by line F. The constriction provided by each tooth causes flow as indicated by the illustrated flow lines and each constriction results in a net decrease in pressure. However each successive constriction produces successively less pressure reduction and so multiple tooth seals cannot completely eliminate leakage. The number of teeth which are feasible in a particular design may also be limited by other factors such as the amount of axial space which is available.

Figure 1D:
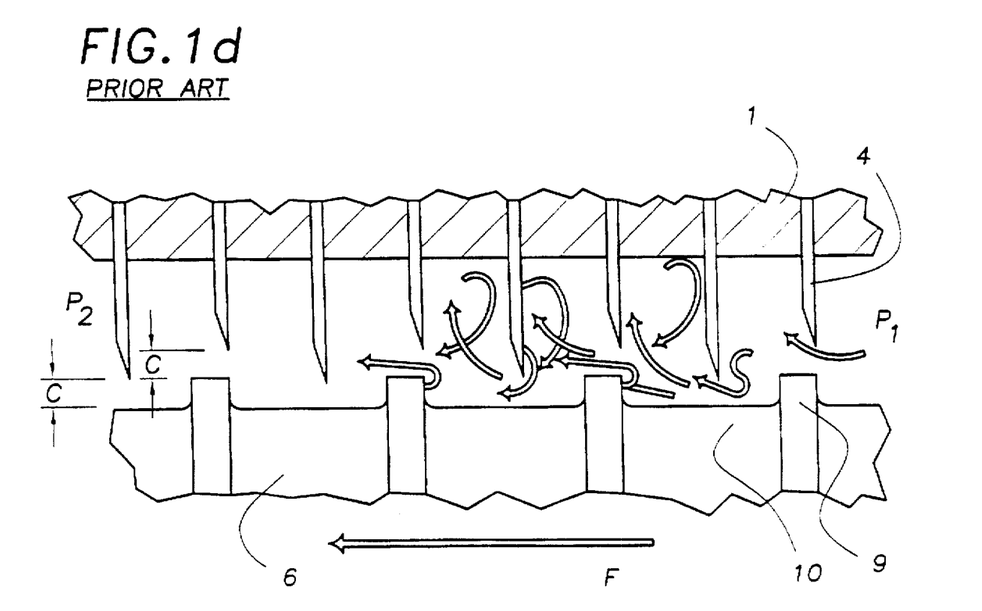
FIG. 1d illustrates a multi-toothed turbine seal having a high-low tooth orientation as commonly known in the art.
Figure 1E:
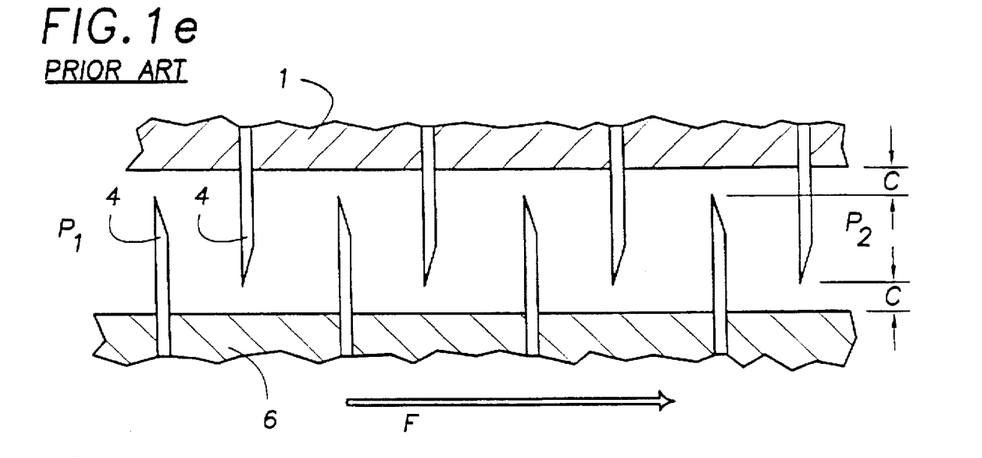
FIG. 1e illustrates a multi-toothed turbine seal having teeth alternately extending from opposing structures as commonly known in the art.

The third conventional manner for minimizing leakage is to alternate the radial positions of the radial gaps in a multi-tooth seal. An example is illustrated in FIG. 1d. In this arrangement, teeth 4 of alternating lengths are provided to correspond with high 9 and low 10 portions of the rotating member 6. A functionally similar arrangement is illustrated in FIG. 1e, in which teeth 4 extend radially inward toward and outward from the rotating member 6 in an alternating pattern. The leakage minimization provided by these arrangements is preferable to that provided by the arrangement of FIG. 1b. However, the ability to employ such arrangements depends on the structure of the rotating member, and as such will not be available in all instances.

Figure 1F:
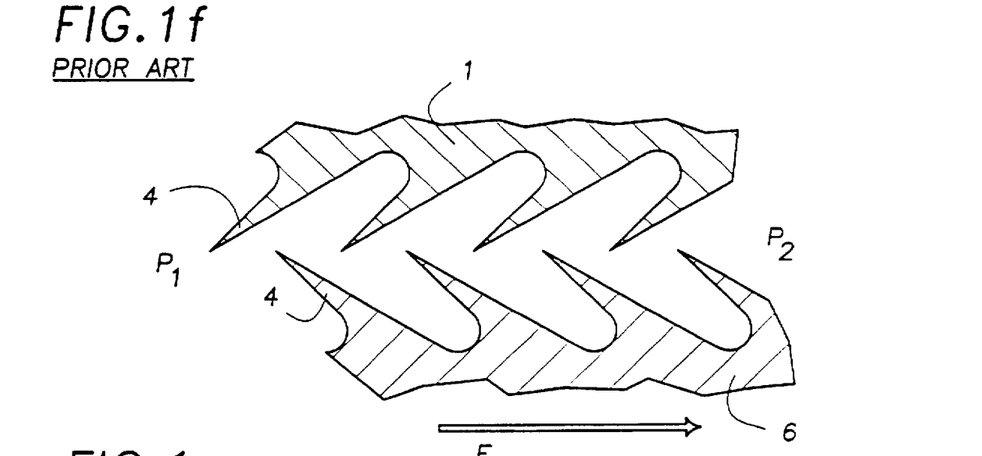
FIG. 1f illustrates a multi-toothed turbine seal including teeth angled opposite a leakage flow as commonly known in the art.
Figure 1G:
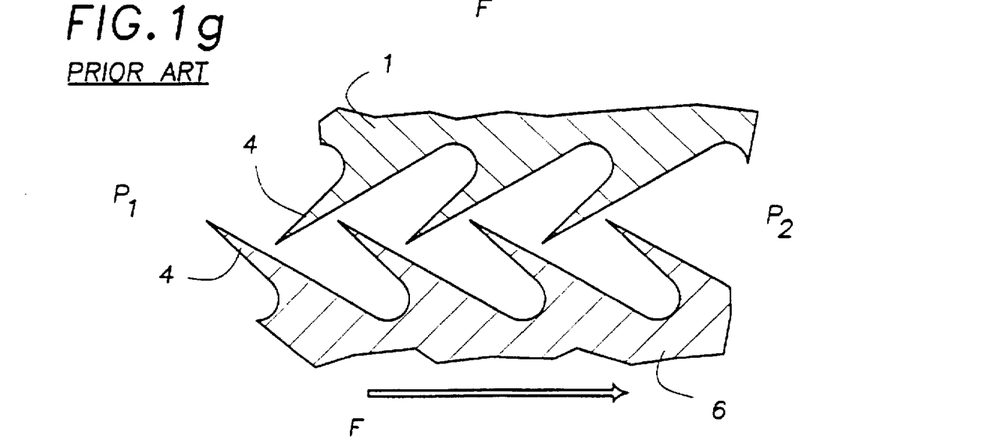
FIG. 1g illustrates a multi-toothed turbine seal including teeth angled opposite a leakage flow as commonly known in the art.

The fourth conventional manner for minimizing fluid leakage involves providing a seal in which the teeth of the seal are provided at an angle such that the teeth are angled at least somewhat opposite the general direction of leakage flow. An example is illustrated in FIG. 1f. In the structure of this example, which is sometimes referred to as a "herringbone" structure, teeth 4 extending from the rotating member 6 and from a structure 1 disposed about the rotating member 6 are angled such that they are directed somewhat opposite the flow of working fluid which generally follows the path indicated by line F. This convention has been adapted for use at the periphery of the cover band of a blade row as illustrated in Fowler, U.S. Pat. No. 3,897,169. This convention has further been combined with the convention of providing alternating radial positions of radial gaps, as illustrated by the structure shown in FIG. 1g. However, designs of the latter type are only viable in applications in which thermal expansion is low.

The person of ordinary skill in the turbine art will seek to minimize seal leakage in these four conventional manners, and having optimized the application of each of these conventions to his particular seal design, will consider all options for achieving the desired leakage minimization to have been exhausted. The state of the art in the field of turbine seals is fairly represented by the teaching found in Sanders, Turbine Steam Path Engineering for Operations &

Maintenance Staff, 1988, the contents of which are incorporated herein by reference.

SUMMARY OF THE INVENTION

The present invention is embodied in structures and methods described herein which serve to minimize turbine seal leakage in a manner which is unprecedented in the prior art. A structure embodying the present invention may be described in general terms as a turbine seal provided with means for generating, from the rotary motion of the working fluid relative to a sealing ring, a region of lowered pressure in the working fluid in a region adjacent the high pressure side of the sealing ring. The means for generating a region of lowered pressure may comprise one or more vortex producing and shedding structures. The vortex producing and shedding structures may comprise portions of trailing edges of segments provided in the tooth portion of the sealing ring which are angled outward from the sealing ring toward the high pressure side of the sealing ring.

A further structure embodying the invention may be described in general terms as a sealing ring segment having a base portion, a tooth portion, and means for generating and shedding vortices in a fluid flowing along a path adjacent a side of the tooth portion. The means for generating and shedding vortices may comprise portions of one or more trailing edges of one or more tooth segments which are directed outward from the sealing ring in a common direction.

A method embodying the invention may be described in general terms as producing from rotary motion of the working fluid a region of lowered pressure in the working fluid in a portion of the leakage path adjacent a high pressure side of a sealing ring of the seal. This function may be performed by producing and shedding vortices in the working fluid at one or more points about the circumference of the sealing ring. This function may be accomplished by providing a sealing ring having a tooth portion provided in one or more tooth segments, portions of one or more trailing edges of the tooth segments extending outward in a common direction.

A method for producing a structure embodying the invention may be described in general terms as defining one or more tooth segments in the tooth portion of a common sealing ring segment and bending one or more trailing edges of the one or more tooth segments so that at least a portion extends outward. The segments may be defined by producing discontinuities in the tooth portion, for example by shearing the tooth portion.

DESCRIPTION OF DRAWINGS

These and other features of the present invention will be more readily understood from the following detailed description of certain preferred embodiments of the invention, when considered in conjunction with the accompanying drawings in which.

DETAILED DESCRIPTION OF THE INVENTION

Figure 2:
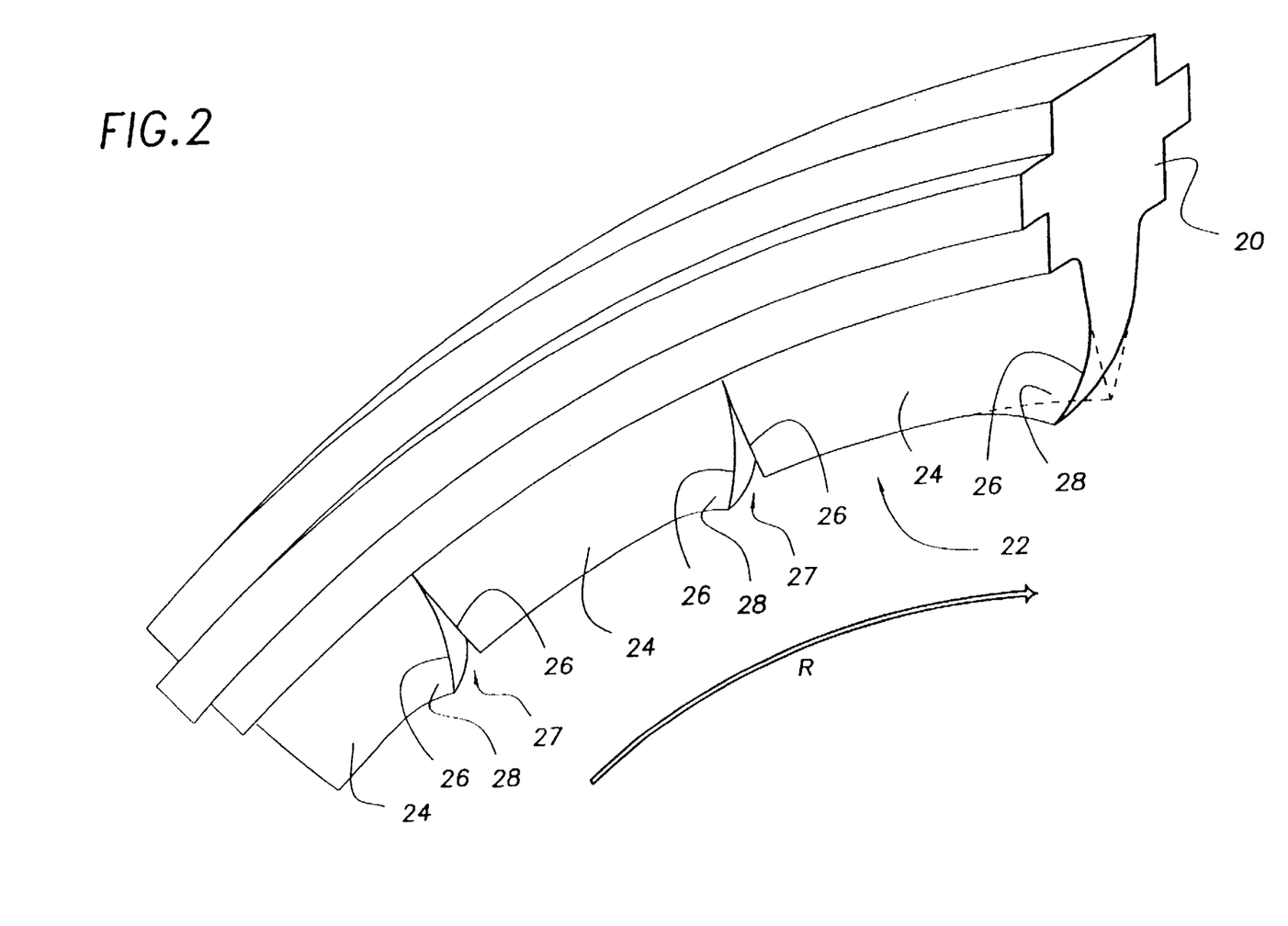
FIG. 2 illustrates an embodiment of the invention in a sealing ring segment.

A sealing ring segment in accordance with the invention may be provided in accordance with the structure of a portion of a sealing ring segment illustrated in FIG. 2. The sealing ring segment may comprise a base portion 20 and a tooth portion 22 extending radially inward therefrom. In alternative embodiment, the ring may be such that the tooth portion extends radially outward from the base portion.

The tooth portion 22 may be provided in the form of one or more tooth segments 24. An edge or edges of one or more of the tooth segments 24 may be defined by discontinuities 27 provided in the tooth portion. Each tooth segment will have an edge which is considered a trailing edge relative to the direction of fluid flow in a turbine in which the segment is to be employed. At least a portion of one or more of the trailing edges may extend outward from the sealing ring. FIG. 2 shows a manner in which a portion of a trailing edge may extend outward relative to the standard position (shown in broken lines) of a tooth portion of a common sealing ring. Each outwardly extending portion 28 of a trailing edge will function to generate turbulence in a fluid flowing adjacent the sealing ring in the rotary direction indicated by line R by producing and shedding vortices in the fluid.

Figure 3:
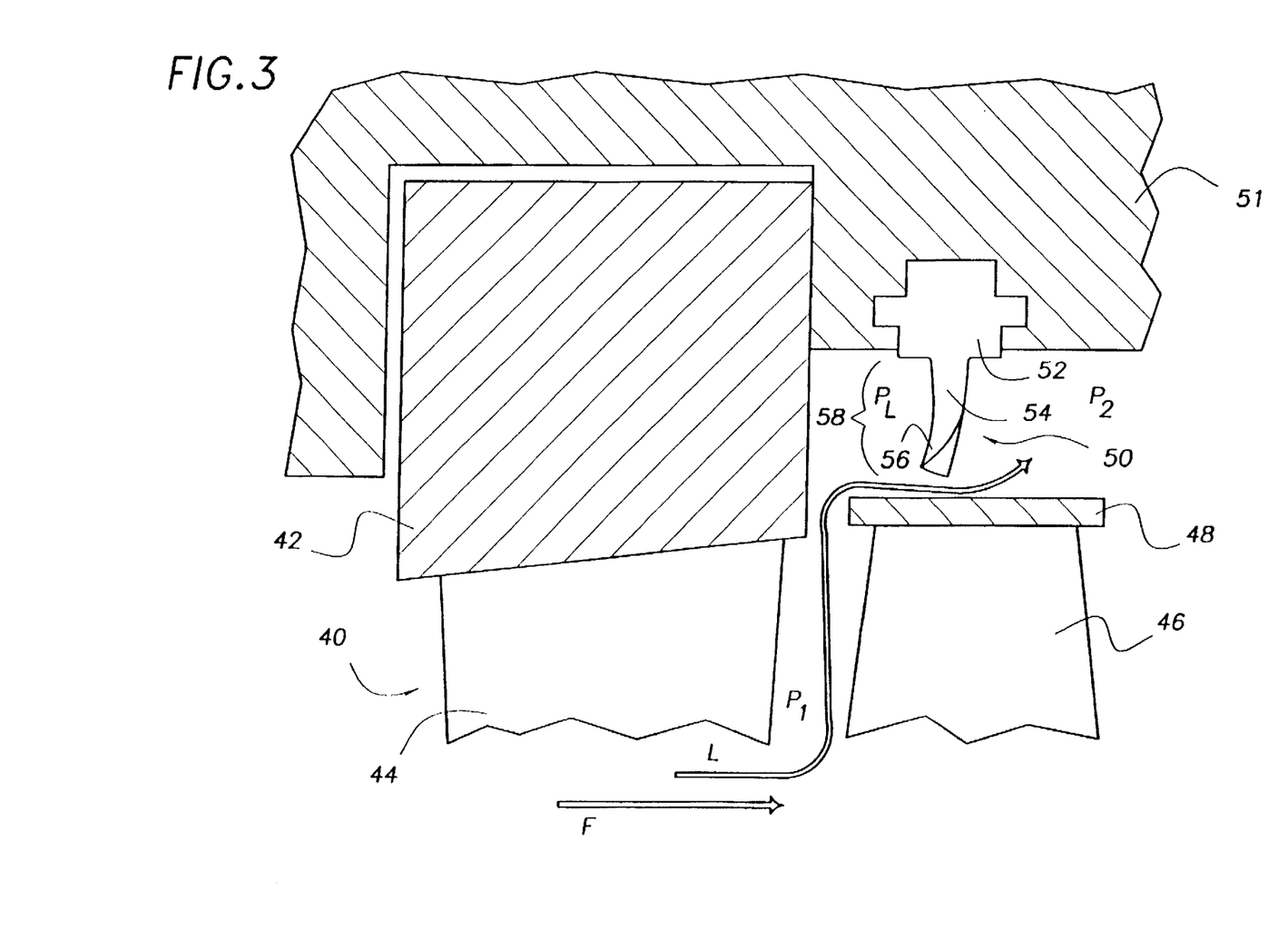
FIG. 3 illustrates an embodiment of the invention in a seal provided about a blade row in a turbine.
Figure 4:
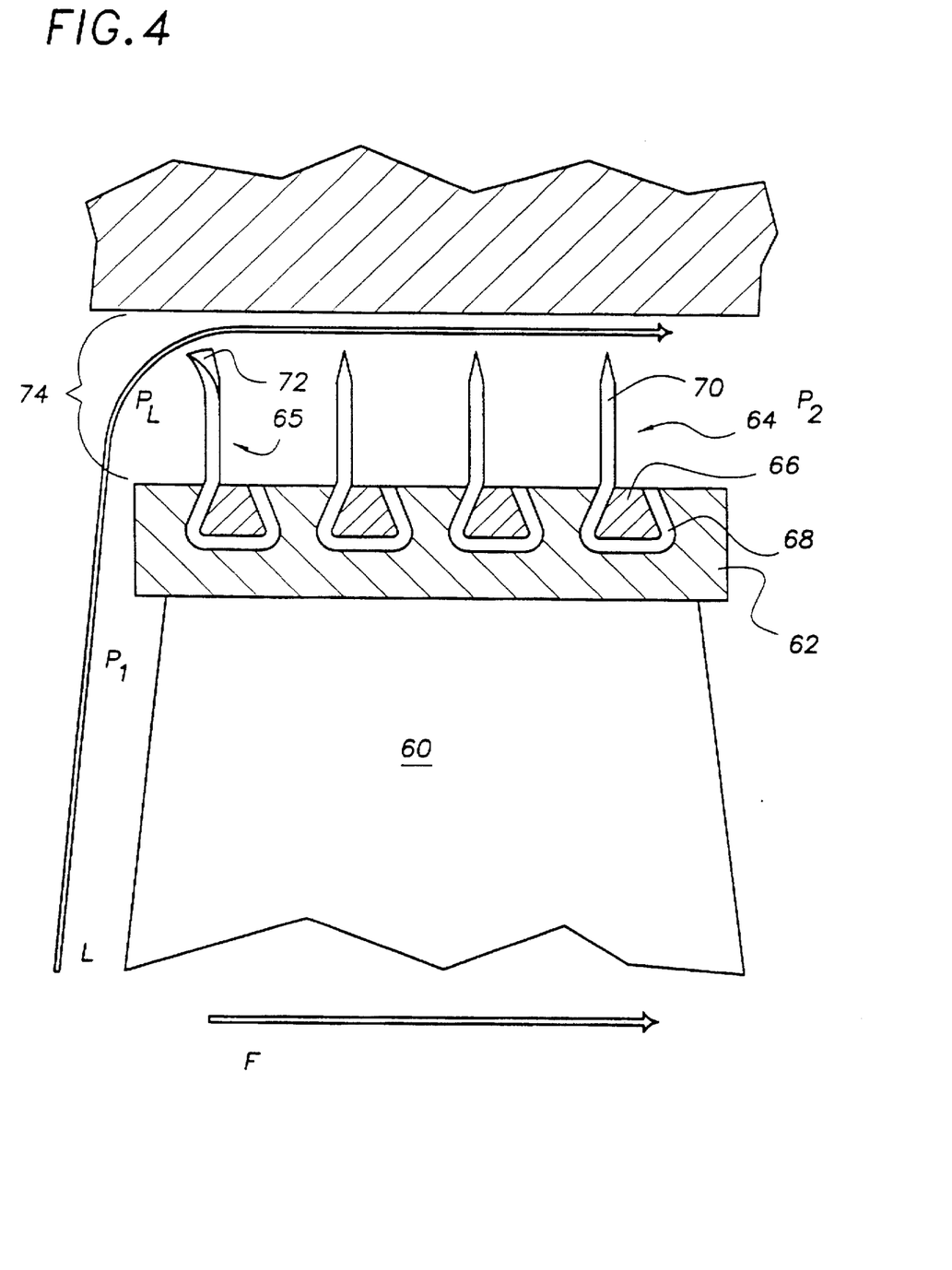
FIG. 4 illustrates an embodiment of the invention in a seal comprising a plurality of sealing rings mounted to the cover band of a blade row.

The structure illustrated by FIG. 2 or equivalent structures may be employed in accordance with the embodiments of the invention illustrated in FIG. 3 and FIG. 4. FIG. 3 illustrates in sectional view a portion of a turbine which includes a diaphragm 40 comprising an outer ring 42 which surrounds a series of blade vanes 44. The blade vanes direct a working fluid toward a rotating blade row 46 extending from a rotating shaft (not shown). The working fluid is directed generally in the axial direction indicated by line F. A portion of the working fluid will circumvent the rotating blade row 46 through a leakage path as indicated by line L. For purposes of this illustration it is assumed that the blade row 46 is rotating such that the illustrated upper portion is moving out from the page toward the observer.

A sealing ring 50 may be mounted to a supporting structure 51 within the turbine so as to encircle the cover band 48 of the blade row 46. The sealing ring 50 may comprise a plurality of sealing ring segments. A sealing ring segment may comprise a base portion 52 and an inwardly extending tooth portion 54. The tooth portion of a sealing ring segment so mounted acts as a barrier to working fluid traveling along the leakage path L such that the pressure $P_2$ of fluid which has passed the tooth portion is less than the working pressure $P_1$ of fluid in the stage of the turbine upstream of the seal. The sealing ring thus provides a seal which separates a first stage of the turbine from an adjacent stage having a relatively lower working pressure. In accordance with this function, the side of the seal facing the stage of the turbine having the higher working pressure is referred to as the high pressure side of the seal, while the side of the seal facing the stage of the turbine having the lower working pressure is referred to as the low pressure side of the seal. The same convention may be applied when referring to sides of a sealing ring.

The tooth portion 54 may be provided as one or more tooth segments, as in the manner of the structure illustrated in FIG. 2. An outwardly extending portion of an edge 56 of a tooth segment may extend outward from the sealing ring toward the high pressure side of the seal. The outwardly extending edge of the tooth segment generates a region 58 of lowered pressure in working fluid flowing in a rotary manner relative to the sealing ring in the leakage path adjacent the sealing ring 50. The region of lowered pressure results from turbulence generated as a consequence of the flow of working fluid along a path adjacent the tooth portion of the sealing ring and its interaction with the outwardly extending edge portion. The outwardly extending edge portion generates turbulence by producing and shedding vortices in the working fluid. Consequently a region of lowered pressure having a pressure $P_L$ is generated within the portion of the leakage path adjacent the sealing ring. This lowered pressure produces less leakage of fluid through the seal than that which would result if the pressure in the region adjacent the high pressure side of the sealing ring was the same as the working pressure $P_1$.

FIG. 4 illustrates in sectional view a portion of a turbine which includes a rotating blade row 60 encircled by a cover band 62. A working fluid is directed toward the rotating blade row 60 generally in the axial direction indicated by line F. A portion of the working fluid will circumvent the rotating blade row 60 through a leakage path as indicated by line L. For purposes of this illustration it is assumed that the blade row 60 is rotating such that the illustrated upper portion is moving into the page away from the viewer.

A seal may be provided in the form of a plurality of sealing rings 64 mounted to the cover band 62 by means of caulking strips 66. Each sealing ring may comprise a plurality of sealing ring segments. Each sealing ring may comprise a base portion 68 and a tooth portion 70. The tooth portions of sealing rings so mounted act as barriers to working fluid traveling along the leakage path L such that the pressure $P_2$ of fluid which has passed the tooth portion is less than the working pressure $P_1$ of fluid in the stage of the turbine upstream of the seal.

A portion of an edge 72 of a tooth segment of a sealing ring 65 may extend outward from the sealing ring toward the high pressure side of the seal. In a multiple tooth embodiment such as that shown in FIG. 4, it is preferred to locate such a sealing ring at the high pressure side of the seal. The outwardly extending edge of the tooth segment generates a region 74 of lowered pressure in working fluid flowing in a rotary manner relative to the sealing ring in the leakage path adjacent the sealing ring 65. The region of lowered pressure results from turbulence generated as a consequence of the flow of working fluid along a path adjacent the tooth portion of the sealing ring and its interaction with the outwardly extending edge portion. The outwardly extending edge portion generates turbulence by producing and shedding vortices in the working fluid. Consequently a region of lowered pressure having a pressure $P_L$ is generated within the portion of the leakage path adjacent the sealing ring. This lowered pressure produces less leakage of fluid through the seal than that which would result if the pressure in the region adjacent the high pressure side of the sealing ring was the same as the working pressure $P_1$.

While a variety of structures may be used to produce and shed vortices, it is preferable that the number of such structures is chosen to minimize resonance in the associated rotating member. For example, in an application of the invention in conjunction with a blade row, it would be preferable to choose a number of vortex producing and shedding structures such that the ratio of vortex producing and shedding structures to blades is not a whole number.

A ring segment in accordance with the invention may be formed from a ring segment of the types commonly known in the art, for example, the ring segments illustrated in FIGS. 1a and 1b. Such ring segments may comprise a base portion and a radially inwardly extending tooth portion. Alternatively, the ring segment may comprise a base portion and a radially outwardly extending tooth portion. To produce a ring segment in accordance with the present invention, one or more tooth segments may be defined from the tooth portion of the ring segment. In this regard it is noted that a single tooth segment may be defined from the tooth portion of the ring segment without making any physical change to the tooth portion. More than one tooth segment may be defined from the tooth portion by producing one or more discontinuities in the tooth portion. A trailing edge of one or more of the tooth segments may be bent to extend at least a portion of the trailing edge outward from the sealing ring segment. Each outwardly extending trailing edge portion should extend in a common direction. Discontinuities in the tooth portion may be provided by applying a shearing force to shear the tooth portion at the desired location of the discontinuity. A ring segment produced in this manner is preferred due to its simplicity of production.

While the specific embodiments described above provide structures and methods which are best modes presently known to the inventors for carrying out the claimed inventions, the claimed inventions are capable of a variety of alternative embodiments. For example, the invention may be used in conjunction with any portion of a rotating member of a turbine such as a blade row, rotor, or other portion. The invention may be used in conjunction with any of the commonly known seal configurations as described above, including multiple tooth seals and multiple ring seals, and may be used in conjunction with seals in which teeth extend radially inward toward a rotating member, radially outward from a rotating member, or both. With respect to the seal illustrated in FIG. 3, the means for generating a region of lowered pressure need not be integral with a sealing ring, but could instead be provided as part of the support structure or as another ring type device employed upstream of a sealing ring. With respect to the sealing ring structure shown in FIGS. 2 and 3, it is noted that the tooth segments need not be defined by discontinuities in the tooth portion, but rather could be provided such that the tooth segments form a continuous tooth portion while also providing the requisite vortex producing and shedding means. Similarly it is noted that a sealing ring including vortex producing and shedding means need not be of the illustrated single tooth type, but could comprise multiple parallel tooth portions extending from a single base portion. Those of ordinary skill in the art will be aware of other embodiments which may be employed without departing from the scope of the invention as defined in the following claims.

What is claimed is:

1. An apparatus for sealing a leakage path in a turbine comprising:

a sealing ring comprising a base portion and a tooth portion, the sealing ring being supported coaxially about a rotatable member of the turbine by means for supporting the sealing ring; and means for generating, from rotary motion of a working fluid relative to the sealing ring in a portion of the leakage path adjacent a high pressure side of the sealing ring, a region of lowered pressure in the working fluid in the portion of the leakage path adjacent the high pressure side of the sealing ring.

2. The apparatus of claim 1, wherein the means for generating a region of lowered pressure comprises one or more means for producing and shedding vortices.

3. The apparatus of claim 2, wherein the means for producing and shedding vortices is integral with the sealing ring.

4. The apparatus of claim 3, wherein the means for producing and shedding vortices comprises the tooth portion of the sealing ring, the tooth portion comprising one or more tooth segments, at least a portion of a trailing edge of one or more of the one or more tooth segments extending outward from the seal toward the high pressure side of the seal.

5. The apparatus of claim 4, wherein the one or more tooth segments are defined by one or more discontinuities provided in the tooth portion.

6. A sealing ring segment for use in a turbine seal, the sealing ring segment comprising:
    a base portion;
    a tooth portion extending radially from the base portion; and
    means for generating and shedding vortices in a fluid flowing along a path adjacent a high pressure side of the tooth portion.

7. The apparatus of claim 6, wherein the means for generating and shedding vortices comprises the tooth portion, the tooth portion comprising one or more tooth segments, at least a portion of a trailing edge of one or more of the one or more tooth segments extending outward from the sealing ring segment, all outwardly extending portions extending in a common direction.

8. The apparatus of claim 7, wherein the one or more tooth segments are defined by one or more discontinuities provided in the tooth portion.

9. A sealing ring segment for use in a turbine seal, the sealing ring segment comprising:
    a base portion; and
    a tooth portion extending radially from the base portion, the tooth portion comprising one or more tooth segments, at least a portion of a trailing edge of one or more of the one or more tooth segments extending outward from the sealing ring segment, all outwardly extending portions extending in a common direction, said trailing edge being defined with respect to an expected rotary direction of fluid flow adjacent said sealing ring segment.

10. The apparatus of claim 9, wherein the one or more tooth segments are defined by one or more discontinuities provided in the tooth portion.

11. The sealing ring segment of claim 9 wherein said portion of a trailing edge comprises a portion remote from said base portion.

12. A method for restricting leakage of a working fluid through a leakage path between a sealing ring and a rotating member of a turbine, comprising:
    generating, from rotary motion of the working fluid relative to the sealing ring in a portion of the leakage path adjacent a high pressure side of the sealing ring, a region of lowered pressure in the working fluid in the portion of the leakage path adjacent the high pressure side of the sealing ring.

13. The method of claim 12, wherein the step of generating a region of lowered pressure comprises producing and shedding vortices.

14. The method of claim 13, wherein the sealing ring comprises a sealing ring segment, the sealing ring segment comprising a tooth portion extending radially from a base portion, the tooth portion comprising one or more tooth segments, at least a portion of a trailing edge of one or more of the one or more tooth segments extending outward from the sealing ring segment, all outwardly extending portions extending in a common direction, the step of producing and shedding vortices being performed by the one or more outwardly extending portions of the trailing edges of the one or more tooth segments.

15. The method of claim 14, wherein the one or more tooth segments are defined by one or more discontinuities provided in the tooth portion.

16. A method for producing an improved sealing ring segment comprising:
    providing a sealing ring segment comprising a base portion and a tooth portion extending radially therefrom;
    defining from the tooth portion one or more tooth segments; and
    bending a trailing edge of one or more of the one or more tooth segments such that at least a portion of the trailing edge extends outward from the sealing ring segment, each outwardly extending portion of a trailing edge extending in a common direction, said trailing edge being defined with respect to an expected rotary direction of fluid flow adjacent said sealing ring segment.

17. The method of claim 16, wherein the one or more tooth segments are defined by producing one or more discontinuities in the tooth portion.

18. The method of claim 17, wherein the one or more discontinuities are produced by applying a shearing force to the tooth portion.

19. The method of claim 16, further comprising the step of selecting a number of tooth segments for trailing edge bending so as to minimize resonance in an associated rotating member.

* * * * *